US011669946B2

(12) United States Patent
Cohen et al.

(10) Patent No.: US 11,669,946 B2
(45) Date of Patent: Jun. 6, 2023

(54) HIGH-CONTENT IMAGING SYSTEM TO GENERATE ENHANCED IMAGES AND METHOD OF OPERATING THE SAME

(71) Applicant: Molecular Devices, LLC, San Jose, CA (US)

(72) Inventors: Avrum I Cohen, San Jose, CA (US); Dihui Hong, San Jose, CA (US); Steve Luke, San Jose, CA (US); Stephen Rhein, San Jose, CA (US)

(73) Assignee: MOLECULR DEVICES, LLC, San Jose, CA (US)

( * ) Notice: Subject to any disclaimer, the term of this patent is extended or adjusted under 35 U.S.C. 154(b) by 0 days.

(21) Appl. No.: 17/771,356

(22) PCT Filed: Oct. 21, 2020

(86) PCT No.: PCT/US2020/056606
§ 371 (c)(1),
(2) Date: Apr. 22, 2022

(87) PCT Pub. No.: WO2021/081056
PCT Pub. Date: Apr. 29, 2021

(65) Prior Publication Data
US 2022/0351349 A1 Nov. 3, 2022

Related U.S. Application Data

(60) Provisional application No. 62/925,554, filed on Oct. 24, 2019.

(51) Int. Cl.
*G06K 9/00* (2022.01)
*G06T 5/50* (2006.01)

(52) U.S. Cl.
CPC ...... *G06T 5/50* (2013.01); *G06T 2207/10056* (2013.01); *G06T 2207/20081* (2013.01)

(58) Field of Classification Search
CPC ............ G06T 5/50; G06T 2207/10056; G06T 2207/20081; G06T 2207/20084;
(Continued)

(56) References Cited

U.S. PATENT DOCUMENTS 9,747,526 B2   8/2017   Paris et al.
10,451,536 B2  10/2019  Thomas
(Continued)

FOREIGN PATENT DOCUMENTS

WO    2018044683 A1    3/2018

OTHER PUBLICATIONS

Kraus, Oren Z., et al. "Automated analysis of high-content microscopy data with deep learning." Molecular systems biology 13.4 (2017): 924. (Year: 2017).*
(Continued)

*Primary Examiner* — Andrew M Moyer
(74) *Attorney, Agent, or Firm* — McCracken & Gillen LLC

(57) ABSTRACT

A high-content imaging system includes a stage, a controller, a machine learning system, and an image generator. The controller receives a request including an output imaging configuration and in response the controller: (1) selects a training model associated with the output imaging configuration, (2) determines an input imaging configuration associated with the training model, and (3) configures the high-content imaging system in accordance with the input imaging configuration. The machine learning system is configured using the training model so when the machine learning system is presented with an image acquired using the input imaging configuration, the machine learning system generates an output image in accordance with the output imaging configuration. The image generator generates an image of a sample on the stage and provides the generated
(Continued)

image to the machine learning system and, in response, the machine learning system generates an output image in accordance with the output imaging configuration.

20 Claims, 5 Drawing Sheets

(58) Field of Classification Search
CPC ......... G06T 5/00; G06T 3/4046; G06N 20/00; G06N 3/0454; G06N 3/084
See application file for complete search history.

(56) References Cited

U.S. PATENT DOCUMENTS

| | | | |
|---|---|---|---|
| 2019/0012521 A1 | 1/2019 | Cohen | |
| 2019/0294930 A1* | 9/2019 | Koike | G06V 10/764 |
| 2020/0409134 A1* | 12/2020 | Yao | G01N 33/574 |

OTHER PUBLICATIONS

International Search Report and Written Opinion in connection with International Appl. No. PCT/US2020/056606, dated Feb. 9, 2021 (9 pages).

\* cited by examiner

HIGH-CONTENT IMAGING SYSTEM TO GENERATE ENHANCED IMAGES AND METHOD OF OPERATING THE SAME

RELATED APPLICATION

This application is a United States National Phase Entry of International Patent Application No. PCT/US2020/056606 filed on Oct. 21, 2020, which claims the benefit of priority from U.S. Provisional Patent Application No. 62/925,554 filed on Oct. 24, 2019. The entire contents of these applications are incorporated by reference herein.

FIELD OF DISCLOSURE

The present subject matter relates to microscopy systems and more particularly, to a high-content imaging system to generate enhanced images and a method of operating such a system.

BACKGROUND

A high-content imaging system (HCIS) may be used to obtain a microscopy image of one or more biological sample(s) such as DNA, proteins, cells, and the like. The biological sample(s) may be disposed in a well of a microplate having a two-dimensional pattern of such wells. Such microplates typically have 96 or 384 wells but may have more or fewer wells. To acquire images of the biological sample(s) disposed in such microplates, an autofocus system of the HCIS focuses on each well of the microplate or a portion thereof and acquires an image. To develop a high-resolution image of the biological sample(s) in a particular well, the imaging sensor may be positioned relative to different portions of the well, focused on such portion, and acquire an image. The images of such different portions may be combined (e.g., concatenated) to produce an image of the entire well. Further, the HCIS may develop a plurality of images of the well, wherein each one of the plurality of images is captured using different imaging configurations. Such imaging configurations specify the illumination source used when the image is captured, one or more filters disposed in the light path between the well (or portion thereof) and the imaging sensor, and the like.

It should be apparent that the repeated focusing and positioning operations described above combined with scanning a plate to produce high resolution images can require a significant amount of time. Further, such time increases substantially if multiple microplates have to be imaged or if a user of the HCIS has to verify and/or adjust positioning of the sample and/or focus of the HCIS during the imaging process. In addition, image processing operations such as deconvolution, noise reduction, and the like may be applied, typically using a computer that receives an image generated by the HCIS, further adding to the amount of time necessary to produce images of the biological sample(s) from the HCIS that are suitable for further analysis.

SUMMARY

In accordance with one aspect, a high-content imaging system includes a stage adapted to have a sample disposed thereon, a controller, a machine learning system, and an image generator. The controller receives a request that includes a specification of an output imaging configuration, and in response the controller: (1) selects a training model associated with the output imaging configuration, (2) determines an input imaging configuration associated with the training model, and (3) configures the high-content imaging system in accordance with the input imaging configuration. The machine learning system is configured using the training model so that when the machine learning system is presented with an image acquired in accordance with the input imaging configuration, the machine learning system generates an output image in accordance with the output imaging configuration. The image generator generates an image of the sample disposed on the stage, automatically provides the generated image to the machine learning system, and, in response, the machine learning system generates an output image in accordance with the output imaging configuration.

In accordance with another aspect, a method of operating a high-content imaging system that includes a stage on which a sample may be disposed, a machine learning system and an image generator includes the step of receiving by one or more processors a request that includes a specification of an output imaging configuration. The method also includes the steps of selecting by the one or more processors a training model associated with the output imaging configuration, in response to receiving the request, determining by the one or more processors an input imaging configuration associated with the training model, and configuring by the one or more processors the high-content imaging system in accordance with the input imaging configuration. Further, the method includes developing a trained machine learning system operating on the one or more processors using the training model so that when the trained machine learning system is presented with an image acquired in accordance with the input imaging configuration, the trained machine learning system generates an output image in accordance with the output imaging configuration. The method includes the additional steps of automatically generating using the one or more processors and an image capture device an image of a sample disposed on the stage, automatically providing the image of the sample to the trained machine learning system, and operating the trained machine learning system to automatically produce an output image in accordance with the output imaging configuration in response to receiving the image of the sample.

Other aspects and advantages will become apparent upon consideration of the following detailed description and the attached drawings wherein like numerals designate like structures throughout the specification.

DETAILED DESCRIPTION

Figure 1:
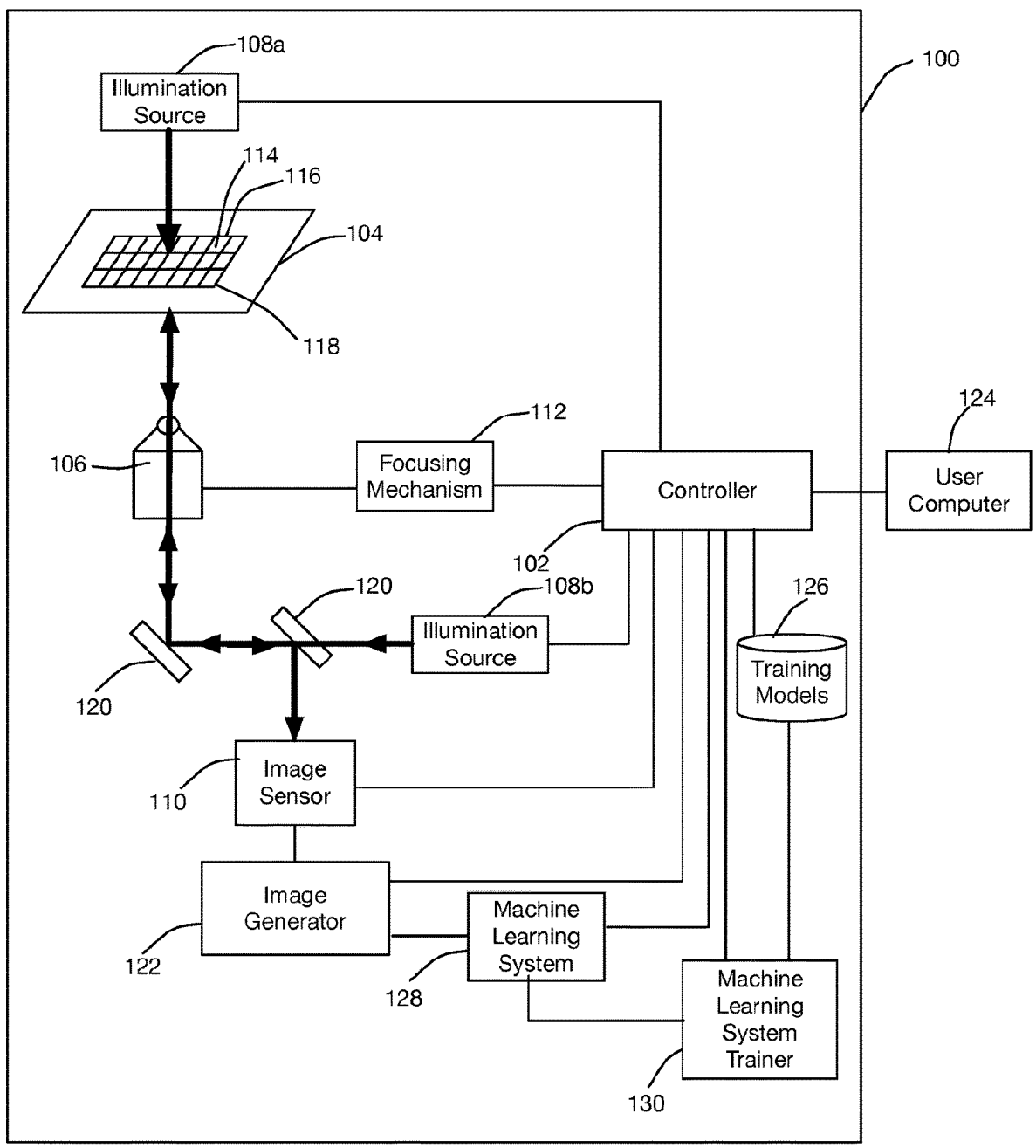
FIG. 1 is a schematic diagram of a high-content imaging system (HCIS) in accordance with the present disclosure.

As described in detail below, a high-content imaging system (HCIS) in accordance with the present disclosure includes a stage on which a sample or a microplate having a sample may be disposed, one or more illumination sources, one or more objective lens(es), one or more filter(s), a focusing apparatus, an imaging sensor, a machine learning system, a controller and one or more machine learning system training model(s) that may be used with the machine learning system. Each training model is associated with an input imaging configuration and an output imaging configuration and includes data necessary to configure and train an untrained machine learning system (e.g., a neural network or another deep learning system). For example, if the untrained machine learning system is a neural network, the training model includes parameters regarding the interconnections of one or more convolution layers, one or more neuron layers, and one or more pooling layers therebetween. The training model also includes scaling factors, kernel weights, and the like associated with such layers.

The untrained machine learning system may be configured with a particular training model to develop a trained machine learning system. Thereafter, when the trained machine learning system is presented with an input (or source) image captured when the HCIS is configured with the input imaging configuration associated with the particular training model, the machine learning system produces an output (or target) image that represents the image that would have been generated if the HCIS had been configured with the output imaging configuration associated with the particular training model.

During operation, a user uses a computer in communication with the HCIS to transmit a request to the controller of the HCIS to produce an output image of a biological sample disposed in a well of a microplate disposed therein. Such request may include a specification of an output imaging configuration to use when producing the image and identifies, for example, an objective lens, resolution, illumination source, one or more optical filters, focusing accuracy, and/or types of imaging aberrations or artifacts that should be corrected for in the output image. Such aberrations/artifact correction may include correcting for field curvature of the objective lens, deconvolution of the image to improve contrast and/or resolution, and the like.

The controller analyzes the output image specification and selects a training model associated with such output image specification. The controller then determines the input image specification associated with the selected training model, configures the untrained machine learning system with the training model to produce the trained machine learning system, configures the HCIS according to the input imaging configuration, and captures an image. The controller provides the captured image to the trained machine learning system as an input, the trained machine learning system generates an output image that represents an image that would have been captured if the HCIS had been configured using the output imaging configuration, and the controller transmits the output image generated by the HCIS to the user's computer.

In some embodiments, the training model may be associated with an input configuration that requires a first set of physical components (e.g., objective lens, illumination source, etc.) installed in the HCIS and an output configuration that requires a second set of physical components, some of which may not present in the HCIS. If an untrained machine learning system of the HCIS is configured with such training model to develop a trained machine learning system, the HCIS (having the trained machine learning system) will produce from an input image acquired using the first set of physical components, an output image that represents the image that would have been acquired with the second set of physical components. Thus, for example, in such embodiments, the HCIS is able to produce output images as if the HCIS included additional components without the costs associated with such additional components.

In some embodiments, the HCIS can be operated using an input imaging configuration that captures images quickly (e.g., capture low resolution images using coarse focusing). A training model associated with such input configuration and an output configuration that requires more time to capture an image (e.g., capture high resolution images with very precise focusing) may be used to train the machine learning system. The HCIS having such trained machine learning system produces output images as if they were captured using a more time-consuming configuration from input images captured relatively faster, which improves the throughput of the HCIS. Also, because the additional image processing/correction operations may be incorporated into the training model used to train the machine learning system, undertaking these operations does not require any additional time beyond what the trained machine learning system takes to generate the output image from the input image, thus yielding additional throughput improvements.

Referring to FIG. 1, an embodiment of an HCIS 100 includes a controller 102, a stage 104 on which a sample (or a microplate carrying such sample) may be disposed, one or more objective lens(es) 106, one or more illumination sources 108, an image sensor 110, and a focusing apparatus 112. As described below, the HCIS 100 may be used to generate a transmitted light image and/or a fluorescent light image of a sample 114 disposed in a well 116 of a microplate 118 disposed on the stage 104. The stage 104 may be an X-Y stage that is moveable along a plane that is parallel to the imaging plane of the image sensor or an X-Y-Z that is movable along the plane parallel to an imaging plane of the image sensor 110 and also a plane perpendicular to the imaging plane.

To generate the transmitted light image of the sample 114, the controller 102 operates an illumination source 108a to transmit light through the sample 114 (and the microplate 118 in which the sample 114 is disposed). The light is then directed through a selected objective lens 106, optionally redirected by mirrors 120 to form an image on a surface of the image sensor 110. The image sensor 110 generates signals in accordance with the light sensed thereby and such signals are converted into an image by an image generator 122.

To generate a fluorescent image of a sample 114, the controller 102 operates an illumination source 108b to generate light that is redirected by the one or more mirrors 120, through the objective lens 106, through the microplate 118, and to the sample 114. The light that reaches the sample 114 may excite the sample 114 and cause the sample 114 to fluoresce. The light emitted by the sample 114 passes through the objective lens 106 and is directed by the one or more mirrors 120 to form an image on the surface of the image sensor 110, which generates signals in response to such image that are converted by the image generator 122 into an image.

One or more optical filters may also be optionally disposed in the light path between the illumination source 108 and the sample 114 and/or between the sample 114 and the image sensor 110.

As would be understood by one who has ordinary skill in the art, the image generator 122 receives signals and converts such signals into pixel values of an image. Further, the image generator 122 may receive signals associated with sub-images of the biological sample 114 as the image sensor 110 scans such sample 114 and combines such sub-images into a complete image.

With continued reference to FIG. 1, during operation, the controller 102 receives from a computer 124 operated by a user a request to generate one or more image(s) of the sample 114. As noted above, such request includes a specification of the output imaging configuration noted above. The controller 102 queries a database 126 to select a training model associated with the output imaging configuration received with the request. In some embodiments, for some training models in the database 126, the HCIS 100 will produce an image more efficiently when configured with an input imaging configuration associated with the training model than when configured with the output imaging configuration associated with the request. Further, the input imaging configuration associated with the training model in the database 126 may specify equipment (e.g., illumination source, objective lens, etc.) that is installed in the HCIS 100, whereas the output imaging configuration received with the request may require equipment not installed in the HCIS 100.

After selecting a particular training model from the database 126, the controller 102 configures an untrained machine learning system 128 in accordance with the training model to develop a trained machine learning system 128. In some embodiments, the controller 102 may reset the machine learning system 128 to an untrained state before configuring such machine learning system 128 with the selected training model.

In some embodiments, the training model is stored on the user computer 124 or on another computer remote from the HCIS 100. In such embodiments, the controller 102 requests the training model from the computer on which the training model is stored. In some embodiments, the user computer 124 may provide the training model to the controller 102 as part of the request sent thereby to generate one or more image(s) of the sample 114. In such embodiments, the user computer 124 may load the training model from storage associated therewith or from a computer remote therefrom. Further, in some cases, the user computer 124 may ask the user to locate, for example, one or more data file(s) in which the training model is stored and provide such data file(s) to the controller 102.

After the trained machine learning system 128 has been developed, the controller 102 configures the HCIS 100 in accordance with the input imaging configuration associated with the selected training model. In particular, the controller 102 loads the objective lens 106, configures the image sensor 110, operates the illumination source 108 and the focusing apparatus 112 in accordance with the input imaging configuration and directs the image sensor 110 and the image generator 122 to acquire an image.

After the image has been acquired, the acquired image is presented as an input to the trained machine learning system 128 that generates an output image therefrom. The controller 102 receives the output image and transmits such output image to the user computer 124. In some embodiments, the image generator 122, the trained machine learning system 128, and the controller 102 all have access to shared memory that allows images generated by one such component to be accessed by another. In other embodiments, these components communicate on a local area network (or another type of network) and transmit images therebetween.

In some embodiments, the HCIS 100 may include an image quality analyzer (not shown) that receives the output image generated by the trained machine learning system 128. The image quality analyzer applies image analysis algorithms that detect, for example, noise in the image or other artifacts in the image and develops a score that represents the quality of the output image. Thereafter, the image quality analyzer provides the output image and the score to the controller 102 to transmit to the user computer 124.

In some embodiments, the HCIS 100 may include a first image processor (not shown) that automatically receives the acquired image from the image generator 122. The first image processor applies one or more image processing function(s) to the acquired image, for example, to scale the image, reduce noise in the image, and the like, and the processed image is automatically provided as an input to the machine learning system 128. In response, the machine learning system 128 generates the output image that is then provided to the controller 102, as described above.

In some embodiments, the first image processor is integral with the image generator 122 and the generated image is an output of such image processor.

In some embodiments, a second image processor (not shown) may processes the output image developed by the machine learning system 128, for example, to scale the image, reduce noise in the image, and the like, and such processed image is provided to the controller 102 to provide to the user computer 124, as described above.

Whether the first and/or the second image processor(s) is/are used may be determined by the request received from user computer 124 or may be determined in accordance with the input and/or the output imaging configuration(s).

Figure 2:
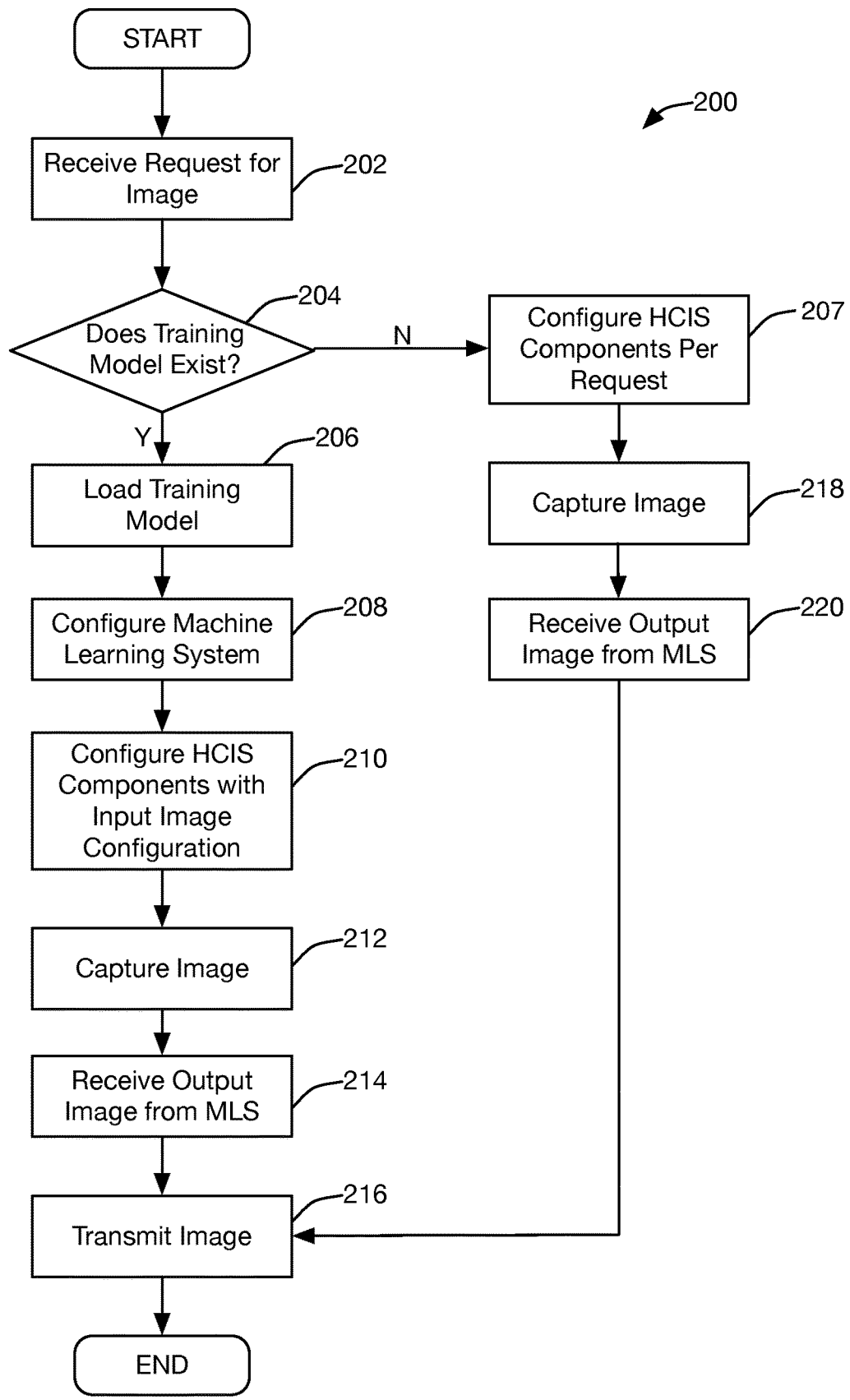
FIG. 2 is a flowchart of steps undertaken by a controller of the HCIS of FIG. 1 to generate an output image.

FIG. 2 shows a flowchart 200 of the steps undertaken by the controller 102 to generate an image in accordance with the request received from the computer 124. Referring to FIGS. 1 and 2, at step 202 the controller 102 receives the request to capture an image. As noted above, the request specifies the output imaging configuration for generating the output image.

In some embodiments, the user directs the computer 124 to send a request to the controller 102 that includes an indication whether the HCIS 100 should be operated in a non-enhanced or an enhanced mode. In the non-enhanced mode, the machine learning system 128 is not used. Rather, the controller 102 directs the image generator 122 to capture images and any such captured images are transmitted by the controller 102 to the user computer 124. In the enhanced mode, the trained machine learning system 128 is invoked as described herein to enhance or generate output images from input images generated by the image generator 122. For example, the request received by the controller 102 may specify that enhanced mode is to be used, input images should be acquired using 10× magnification, and the machine learning system 128 should generate output images that represent images that would have been captured using 20× magnification (i.e., enhance resolution). Similarly, the request may specify that enhanced mode is to be used, input images should be acquired using a short exposure time, that the machine learning system 128 should generate output images that represent images that would have been captured if a long exposure time had been used (i.e., enhanced exposure).

At step 204, the controller 102 queries the database 126 to determine if a training model is stored therein associated with the output imaging configuration specified in the request. If such a training model is identified, the controller 102 proceeds to step 206, otherwise, the controller 102 proceeds to step 207.

At step 206, the controller 102 loads the training model identified in step 204 and in step 208 configures the untrained machine learning system 128 with the loaded training model to develop the trained machine learning system 128.

At step 210, the controller 102 configures the HCIS 100 in accordance with the input imaging configuration associated with the training model identified in step 204. Thereafter, the controller 102 directs the image sensor 110 and/or image generator 122 to capture and generate an image. In some embodiments, when the controller 102 configures the HCIS 100 at step 210, the controller 102 also configures the image generator 122 to automatically provide the image generated thereby to the machine learning system 128 as an input. For example, in some cases, the image generator 122 may store the image generated thereby in a data store (e.g., a memory, a disk, etc.) accessible by the machine learning system 128 or transmit the image using an interprocess communications channel between the image generator 122 and the machine learning system 128. The machine learning system 128 may be configured to poll such data store or channel for the presence of image data and, when available, load the image data as an input. In other embodiments, the image generator 122 may invoke the machine learning system 128 automatically, for example, as a function call and pass the image to the machine learning system 128 as part of such invocation.

At step 214, the controller 102 receives the output image generated by the machine learning system 128 either via a shared data store or communications channel as described in the foregoing.

At step 216, the controller 102 transmits the output image received from the machine learning system 128 to the computer 124. In some embodiments, the controller 102 also receives from the image generator 122 the image that was provided to the machine learning system 128, for example, at step 212, and at step 216 transmits to the computer 124 both the image received from the image generator 122 and the image produced by the machine learning system 128.

In some embodiments, the request received from the controller 102, at step 202, may specify that enhanced mode should be used to generate a plurality of output images from one input image captured at step 212. For example, the request may specify that the input image should be captured using an input imaging configuration (e.g., using a 10× objective lens 106) and that first and second output images should be generated in accordance with a first output imaging configuration (e.g., using a 20× objective lens 106) and a second output imaging configuration (e.g., using a 30× objective lens 106). In response to such request, the controller 102 loads a first training model associated with the input imaging configuration and the first output imaging configuration and a second training model associated with the input imaging configuration and the second output imaging configuration. Thereafter, the controller 102 trains first and second instances of the machine learning system 128 with the first and second training models. In such embodiments, the controller 102 directs the image generator 122 to provide the input image generated thereby as an input to each of the first and second instances of the trained machine learning system 128, each instance of the trained machine learning system 182 generates first and second output images, respectively, in response to such input image. The controller 102 receives the first and second output images and transmits such output images (and optionally the input image) to user computer 124.

If at step 204, the controller 102 determines that the database 126 does not include a training model associated with the output imaging configuration received with If at step 204, the controller 102 determines that the database 126 does not include a training model associated with the output imaging configuration received with request at step 202, the controller 102 configures the HCIS 100 in accordance with the output imaging configuration specified in the request at step 207. At step 218, the controller 102 directs the image sensor 110 and/or the image generator 122 to capture an image. At step 220, the controller 102 receives the captured image from the image generator 122 and, at step 216, the controller 102 transmits the captured image to the computer 124.

In some embodiments, the controller 102 undertakes steps 207-216 automatically if a suitable training model is not identified at step 204. In other embodiments, the controller 102, at step 207, instructs the computer 124 to notify the user thereof that a suitable training model is not available in the database 126. In some embodiments, the controller 102 further instructs the computer 124 (also at step 207) to prompt the user whether the HCIS 100 should be configured in accordance with the output imaging configuration received at step 202. If the computer 124 transmits to the controller 102 that the user responded affirmatively to such prompt, the controller 102 undertakes the steps 207-216

Referring to FIG. 1, some embodiments of the HCIS 100 include a machine learning system trainer 130 to develop additional training models for use with the HCIS 100 to provide additional enhancement functionalities.

Figure 3:
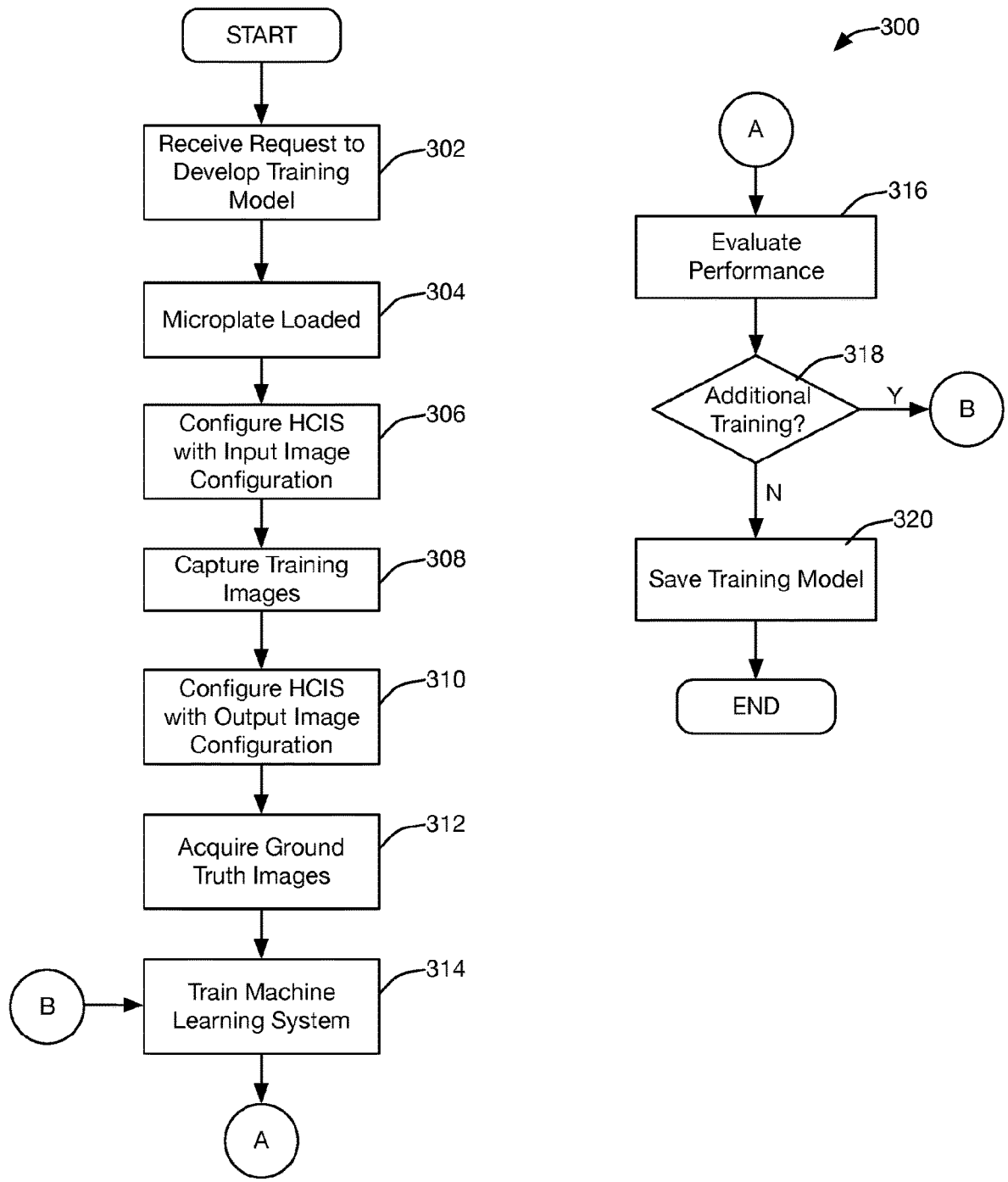
FIG. 3 is a flowchart of steps undertaken by a machine learning system trainer of the HCIS of FIG. 1.

FIG. 3 is a flowchart 300 of the steps undertaken by the machine learning system trainer 130 to develop a new training model for use with the machine learning system 128. Referring to FIGS. 1 and 3, at step 302, the machine learning system trainer 130 receives a request to develop the new training model. The request includes the input imaging configuration and the output imaging configuration that are associated with the new training model.

At step 304, the machine learning system trainer 130 receives an indication that a microplate has been loaded in the HCIS 100.

At step 306, the machine learning system trainer 130 directs the controller 102 to configure the HCIS 100 in accordance with the input imaging configuration specified in the request received at step 302. At step 308, the machine learning system trainer 130 directs the controller 102 to capture a plurality of training images and store such images in a datastore (not shown) that is accessible by the machine learning system trainer 130 and the machine learning system 128.

At step 310, the machine learning system trainer 130 directs the controller 102 to configure the HCIS 100 in accordance with the output imaging configuration specified in the request received at step 302. At step 312, the machine learning system trainer 130 directs the controller 102 to acquire a plurality of ground truth images. Each ground truth image is associated with a particular training image captured at step 308. Such ground truth image and the particular training image are both images taken using the input imaging configuration and the output imaging configuration, respectively, of an identical portion of the biological sample 114 disposed in the microplate 118.

In some embodiments, the machine learning system trainer 130 may apply additional image processing functions to each ground truth image in accordance with the output imaging configuration. Such additional image processing functions may include lens field curvature correction, deconvolution, contrast enhancement, shading correction, image flattening, image stretching, denoising, and the like.

At step 314, the machine learning system trainer 130 trains the machine learning system 128 using a first subset of the plurality training images and the ground truth images corresponding to such training images in the first subset. In particular, the machine learning system trainer 130 operates the machine learning system 128 with a selected one of the first subset of training images and receives a predicted image generated by the machine learning system 128. For each pixel of the predicted image, the machine learning system trainer 130 calculates an error value between such predicted pixel and a corresponding pixel of the ground truth image associated with the selected training image. Such error value may be calculated using, for example, a loss function such as a weighted categorical cross entropy function. The error values calculated for all of the pixels of the predicted image are used to adjust the parameters of the machine learning system 128, for example, using backpropagation, as would be understood by one who has ordinary skill in the art. The machine learning system trainer 130 undertakes developing such error values and adjusting of the parameters with all of the images that comprise the first subset of the training images.

At step 316, the machine learning system trainer 130 evaluates the performance of the trained machine learning system developed at step 314. In particular, the machine learning system trainer 130 selects a second subset of training images as evaluation images and presents each of the evaluation images as an input to the machine learning system 128. The machine learning system 128 generates a predicted image in response to each evaluation image presented as an input. For each evaluation image, the machine learning system trainer 130 compares the pixels of the predicted image generated therefrom by the machine learning system 128 to corresponding pixels of the ground truth image associated with such evaluation image and develops an aggregate error value. All of the aggregate error values developed in this manner are combined to form an aggregate error metric (e.g., percent of pixels of the predicted images are within a predetermined threshold of corresponding pixels of the ground truth images).

At step 318, the machine learning system trainer 130 compares the aggregate error metric to a predetermined acceptable error, and if the aggregate error metric is greater than the predetermined error, machine learning system trainer 130 proceeds to step 314 to further train the machine learning system 128 with a further subset of training images and corresponding ground truth images. In some embodiments, the machine learning system trainer 130 may instruct the computer 124 to display the aggregate error metric and query the user of such computer 124 whether to undertake further training. In other embodiments, the machine learning system trainer 130, also at step 318, determines whether to undertake additional training in accordance with a quantity training images that have been used for training, a quantity of iterations of training (at step 314) that have been undertaken, a rate of improvement in the aggregate error metric between successive training iterations, an amount of time undertaken for training, and other such conditions apparent to one who has ordinary skill in the art. If additional training is warranted, the machine learning system trainer 130 proceeds to step 314.

In some embodiments, a metric that does not depend on a pixel-by-pixel comparison of the predicted image generated from the evaluation image and the ground truth image associated with the evaluation image may be developed. For example, the machine learning system trainer 130 may run an object classification operation on the predicted image and the ground truth image and compare the number and types of objects identified in each image. The percent of objects of each type that match may be used to evaluate performance of the trained machine learning system 128, to develop the aggregate metric, and/or presented to the user of the computer 124.

In some cases, the machine learning system trainer 130, at step 318, may determine that the aggregate error metric is greater the predetermined acceptable error but that additional training is not warranted (e.g., if the aggregate error metric is not improving). In such cases, the machine learning system trainer 130 may instruct the computer to display the aggregate error metric with a message that such aggregate error metric is greater than the predetermined acceptable error and not undertake additional training.

If at step 318, the machine learning system trainer 130 determines that additional training is not to be undertaken, then, at step 320, the machine learning system trainer 130 retrieves the parameters of the trained machine learning system 128 and saves such parameters in the database 126 as a training model associated with the input and output imaging configurations received at step 302. Thereafter, the machine learning system trainer 130 exits.

In some embodiments, at step 320, the machine learning system trainer 130 transmits the training model developed thereby to the user computer 124 or to another computer remote from the HCIS 100 for storage.

Figure 4:
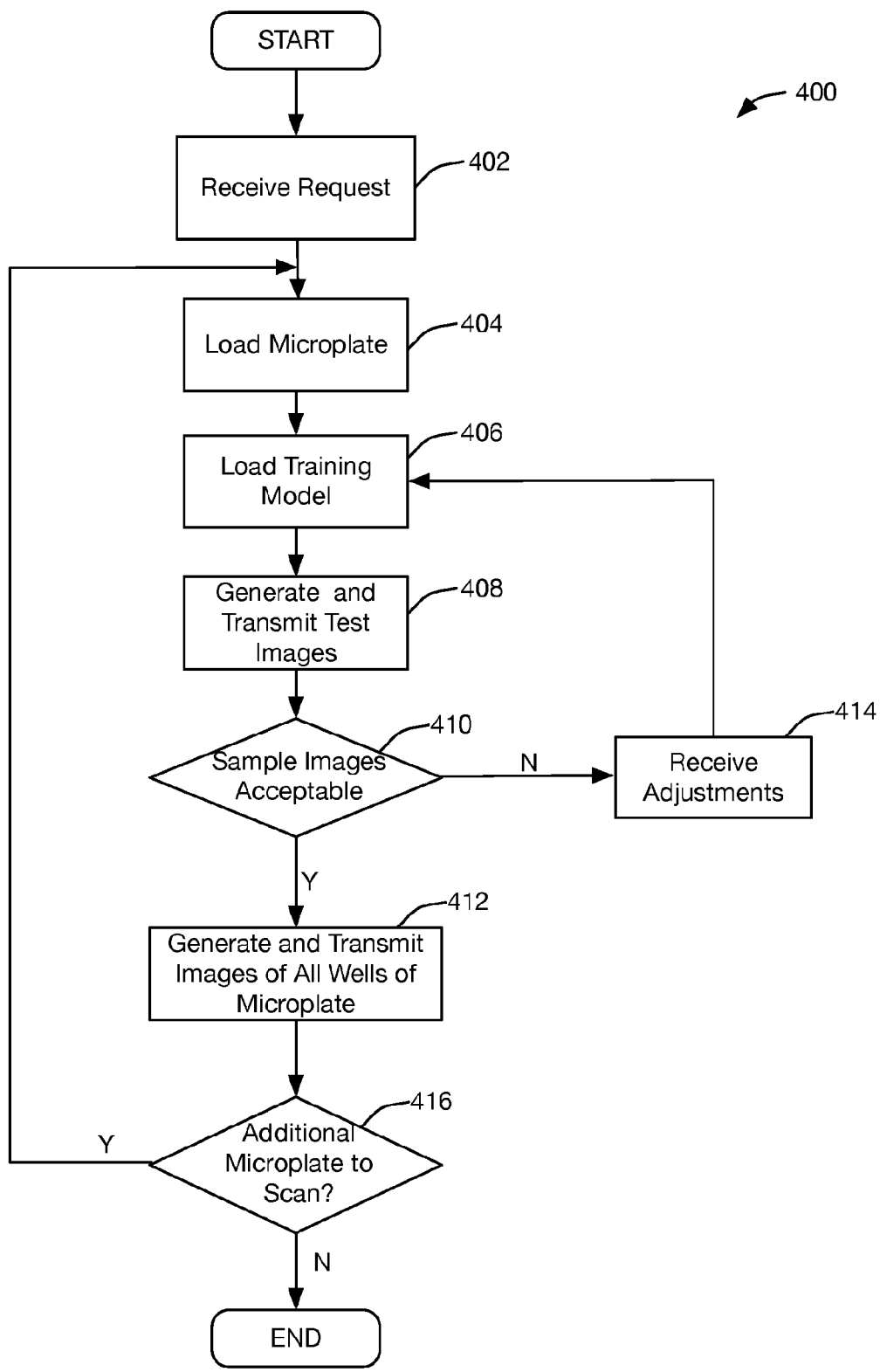
FIG. 4 is a flowchart of steps undertaken by the controller of the HCIS of FIG. 1 to automatically generate images of a plurality of microplates loaded therein.

The HCIS 100 may include a robotic microplate loader (not shown) apparent to one who has ordinary skill in the art and the HCIS 100 may be operated to automatically generate images of the wells 116 of a plurality of microplates 118. FIG. 4 is a flowchart 400 of the steps undertaken by the controller 102 to operate the HCIS 100 in this manner.

The user loads the microplates 118 to be imaged into a holding area of the microplate loader and directs the computer 124 to send a request to the HCIS 100 to scan the microplates 118 that have been loaded.

Referring to FIGS. 1 and 4, at step 402 the controller 102 receives the request for imaging from the computer 124 that includes an output imaging configuration. At step 404, the controller 102 directs the robotic microplate loader to load a first microplate.

At step 406 the controller 102 selects and loads from the database 126 a training model associated with the output imaging configuration. In particular, the controller 102 selects a training model that is associated with the output imaging configuration.

At step 408, controller 102 configures the HCIS 100 in accordance with the input imaging configuration associated with the training model selected at step 406, generates one or more test images of the samples 114 disposed in the microplate 118, and transmits such test images to the computer 124, undertaking steps identical to steps 212-216 shown in FIG. 2 for each such test image. In addition, the controller 102 instructs the computer 124 to display such test images and to prompt the user to verify that the images are acceptable.

At step 410, the controller 102 checks whether the user indicated that the test images are acceptable and proceeds to step 412. Otherwise, at step 414 the controller 102 receives additional adjustments to the HCIS 100 (e.g., a change in illumination, a change in focus, a change in the input and/or output imaging configuration(s), change of sample, change in architecture of the machine learning system 128, a change in the hyperparameters of the machine learning system 128, etc.) or the output imaging configuration. The controller 102 adjusts the components of the HCIS 100 in accordance with the adjustments. Thereafter, the controller 102 returns to step 406. At step 406, if the output imaging configuration has changed, the controller 102 loads a training model that is associated with the modified output imaging configuration.

In some embodiments, the user may adjust the configuration at step 414 to build a more robust training module. For example, the user may direct the controller 102 to develop a training model using a plurality of first, second, and third sets of training images captured using 10, 50, and 200 millisecond exposures, respectively, and ground truth images captured using 1000 millisecond exposure. Alternatively, the user may direct the controller 102 to develop a model using training fluorescent images captured using different wavelengths of light to generate an output image associated with a particular output imaging configuration. A machine learning system configured using a training model developed using multiple input imaging configurations and associated with one output imaging configuration may be able to generate an output image associated with the output imaging configuration from input images captured using a plurality of different input imaging configurations. As would be appreciated by one who has ordinary skill in the art, the plurality of different imaging configurations should be related to those used to develop the training model.

At step 412, the controller 102 automatically generates and transmits images of all of the wells 116 in the microplate 118 loaded at step 404. As should be apparent to one who has ordinary skill in the art, for each image generated, the controller 102 adjusts the stage 104 to position an unimaged well 116 (or portion thereof) of the microplate 118 relative to the lens 106, illumination source 108, and image sensor 110. The controller 102 then undertakes the steps identical to steps 212-216 shown in FIG. 2 to obtain an image of such well 116 and transmit the acquired image to an image storage device (not shown) accessible by the computer 124.

At step 416, the controller 102 determines if any additional microplates remain to be imaged. If so, the controller 102 proceeds to step 404 to direct the robotic microplate loader (not shown) to load an unimaged microplate onto the stage 104. Otherwise, the controller 102 exits.

Figure 5:
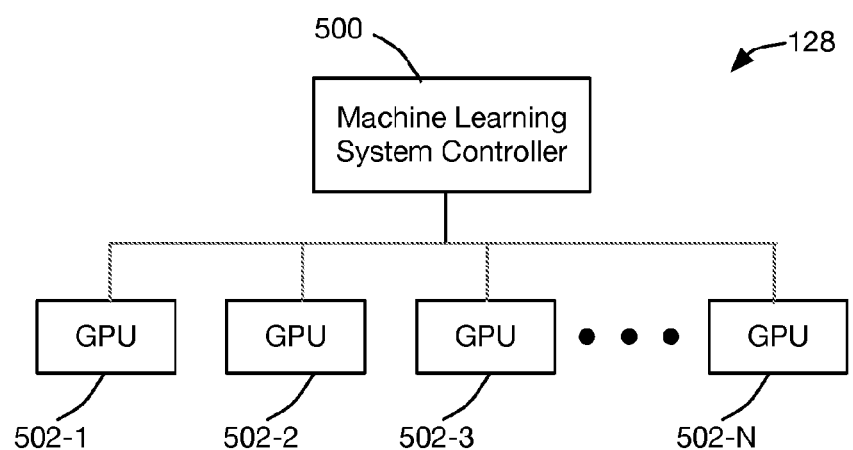
FIG. 5 is a schematic diagram of a machine learning system of the HCIS of FIG. 1.

Referring to FIG. 2, it should be apparent to one who has ordinary skill in the art that the machine learning system 128 may be implemented using a graphical processing unit (GPU). Referring also to FIGS. 2 and 5, the machine learning system 128 includes machine learning system controller 500 and one or more GPU(s) 502. At step 208 (FIG. 2) the controller 102 directs the machine learning system controller 500 to configure each GPU 502 with the training model selected at step 206 (FIG. 2). Thereafter, the image generator 122 provides each image generated thereby to the machine learning system controller 500. The machine learning system controller 500 selects a GPU 502 that is not busy and transfers the generated image thereto for processing. As each GPU 502 completes generating an output image, the machine learning system controller 500 receives the output image developed by such GPU and transfers such output image to the controller 102, which in turn transmits the output image to the computer 124. In this manner, the automated scanning process illustrated in FIG. 5 may be implemented in a high throughput manner. Further, the performance of the HCIS 100 may be scaled up or down in accordance with the number GPU(s) 502 included therein. Further, it should be apparent that the machine learning system controller 500 may use GPU(s) that are installed within the HCIS 100 and/or instances of GPU(s) that are available through cloud services providers such as Amazon AWS, Google Cloud, and the like.

Referring once again to FIG. 1, in some embodiments the machine learning system 128 is a convolutional neural network. In some embodiments, the machine learning system or neural network 128 is configured using AutoML and NASNet technologies developed by Google Inc. of Mountain View, Calif. It should be apparent that other neural network technologies known to those who have skill in the art may be used including, for example, a fully convolutional DenseNet, neural networks optimized for machine vision applications, and the like. It should be apparent that the machine learning system 128 may be another type of machine learning system including a random forest tree and the like.

Although the embodiments described in the foregoing are directed to the use of a machine learning system 128 in an HCIS 100 to generate output images associated with output imaging configurations from input images captured using a different input imaging configurations of the HCIS 100, one of ordinary skill in the art would appreciate that such embodiments may be adapted for use with other types of microscopy and/or imaging systems.

Although, the HCIS 100 described in the foregoing is described as being used to generate individual 2-dimensional images, such HCIS 100 may be adapted to generate a series of two-dimensional transmitted light images of a sample 114 disposed on the microplate 118 taken at different focal points that represent a three-dimensional representation of such sample 114, wherein the images that comprise such series are associated with a substantially identical location of the microplate 118, and the corresponding images of the series are associated with a different focal point (i.e., different Z location). In some embodiments, all of the images that comprise a series may be simultaneously provided to the machine learning system 128 and the machine learning system 128 generates a series of corresponding output images.

In some embodiments, the machine learning system 128 may be trained to perform super-resolution in three dimensions. For example, such machine learning system 128 may generate an output series of images from an input series of captured images. For example, the input series of image may comprise a plurality of captured images wherein the focal distance between successive captured images is varied by a first predetermined amount. The output series of images generated comprises a series of images that represents a series of images that would be captured if the HCIS 100 were operated to vary the focal distance between successive images by a second predetermined amount. Typically, the second predetermined amount would be smaller than the first predetermined amount. For example, the focal distance between successive images of the input series may be varied by 2 microns, and the machine learning system 128 may generate from such input series an output series that represents successive images that would have captured if the focal distance were varied by 0.5 microns. It should be apparent to one who has skill in the art that a training model may be developed to training the machine learning system 128 to perform such super-resolution using the steps described above in connection with FIG. 3.

It should be apparent to one who has ordinary skill in the art that the foregoing disclosure may be applied to other types of imaging systems such as, for example, a confocal microscopy system, a microscopy system that uses structured illumination, and the like. Further, it should be apparent that a training model associated with an imaging configuration associated with a first type of HCIS (e.g., widefield microscopy) and an output imaging configuration with a second type of HCIS (e.g., confocal microscopy) may be used to configure the untrained machine learning system to develop the trained machine learning system. The first type of HCIS having the trained machine learning system may then be used to generate output images representative of an image captured using the second type of HCIS.

It should be apparent to those who have skill in the art that any combination of hardware and/or software may be used to implement the HCIS 100 described herein. It will be understood and appreciated that one or more of the processes, sub-processes, and process steps described in connection with FIGS. 1-5 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-5. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the controller 102, the image generator 122, the machine learning system 128, and the machine learning system trainer 130 of FIG. 1 and the machine learning system controller 500 and GPU(s) 502 of FIG. 5), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A high-content imaging system, comprising:
   a stage adapted to have a sample disposed thereon;
   a controller that receives a request that includes a specification of an output imaging configuration and in response the controller: (1) selects a training model associated with the output imaging configuration, (2) determines an input imaging configuration associated with the training model, and (3) configures the high-content imaging system in accordance with the input imaging configuration;
   a computer-based image generator that operates on at least one processor that generates an image of the sample disposed on the stage in accordance with the input imaging configuration; and
   a computer-based machine learning system that operates on the at least one processor that automatically receives the image of the sample generated by the image generator, and in response, automatically generates an output image, wherein the machine learning system is configured using the training model so that when the machine learning system is presented with an input image acquired in accordance with the input imaging configuration, the machine learning system generates an output image in accordance with the output imaging configuration.

2. The high-content imaging system of claim 1, wherein the machine learning system includes a machine learning system controller and a plurality of graphical processing units, and the machine learning system controller receives the generated image from image generator and in response automatically selects one of the plurality of graphical processing units to generate the output image.

3. The high-content imaging system of claim 1, further including a database of a plurality of training models, wherein the controller receives a further request that includes a further output imaging configuration, the controller determines that none of the plurality of training models is associated with the further output imaging configuration, and in response the controller configures the high-content imaging system in accordance with the further output imaging configuration.

4. The high-content imaging system of claim 1, further including a computer-based machine learning system trainer that operates on the at least one processor that receives a further input imaging configuration and a further output imaging configuration, and the machine learning system trainer trains the machine learning system to develop a further output image in accordance with the further output imaging configuration when presented with a further input image acquired using the further input imaging configuration.

5. The high-content imaging system of claim 4, wherein the machine learning system trainer directs the image generator to produce a plurality of training images of training samples disposed on the stage using the further input imaging configuration and a plurality of ground truth images of the training samples using the further output imaging configuration.

6. The high-content imaging system of claim 1, wherein the controller automatically directs the image generator to automatically generate a plurality of input images of a plurality samples disposed in a microplate disposed on the stage in accordance with the input imaging configuration and the machine learning system to automatically generate from each one of the plurality of input images, an output image in accordance with the output imaging configuration.

7. The high-content imaging system of claim 6, further including a robotic microplate loader wherein the controller directs: (1) the robotic microplate loader to load a further microplate on the stage after the plurality of input images has been generated; (2) the image generator to automatically generate a further plurality of input images of the further microplate; and (3) the machine learning system to automatically generate a further plurality of output images from the input images.

8. The high-content imaging system of claim 1, wherein the controller directs: (1) the image generator to develop a series of input images of the sample taken at varying focal points in accordance with the input imaging configuration; and (2) to provide the series of images simultaneously to the machine learning system to generate a series of output images in accordance with the output imaging configuration.

9. The high-content imaging system of claim 1, further including an image processor that undertakes at least one of (1) image processing the generated image before such image is provided as an input to the machine learning system and (2) image processing the output image developed by the machine learning system.

10. The high-content imaging system of claim 1, wherein the input imaging configuration specifies a first set of physical components present in the high-content imaging system and the output imaging configuration specifies a second set of physical components, wherein at least one of the second set of physical components is not present in the high-content imaging system.

11. A method of operating a high-content imaging system that includes a stage on which a sample may be disposed and an image generator, comprising the steps of:
receiving by one or more processors a request that includes a specification of an output imaging configuration and selecting a training model associated with the output imaging configuration;
in response to receiving the request, determining by the one or more processors an input imaging configuration associated with the training model;
configuring by the one or more processors the high-content imaging system in accordance with the input imaging configuration;
developing a trained machine learning system operating on the one or more processors using the training model so that when the trained machine learning system is presented with an image acquired in accordance with the input imaging configuration, the trained machine learning system generates an output image in accordance with the output imaging configuration;
automatically generating using the one or more processors and an image capture device an image of a sample disposed on the stage and automatically providing the image of the sample to the trained machine learning system; and
operating the trained machine learning system to automatically produce an output image in accordance with the output imaging configuration in response to receiving the image of the sample.

12. The method of operating a high-content imaging system of claim 11, wherein the trained machine learning system includes a machine learning system controller and a plurality of graphical processing units, and further including the steps of operating the machine learning system controller to receive the generated image and in response automatically selecting one of the plurality of graphical processing units to generate the output image.

13. The method of operating a high-content imaging system of claim 12, further including the step of operating at least one graphical processing unit of the plurality of graphical processing units remotely from the machine learning system controller.

14. The method of operating a high-content imaging system of claim 11, further including the steps of receiving a further output imaging configuration, querying a database of a plurality of training models to identify a training model associated with the output imaging configuration, determining that none of the plurality of training model is associated with the further output imaging configuration, and in response configuring the high-content imaging system in accordance with the further output imaging configuration.

15. The method of operating a high-content imaging system of claim 12, further including the steps of receiving a further input imaging configuration and a further output imaging configuration, and training the machine learning system to develop a further output image in accordance with the further output imaging configuration when presented with a further input image acquired using the further input imaging configuration, wherein training the machine learning system includes directing the image generator to produce a plurality of training images of training samples disposed on the stage using the input imaging configuration and a plurality of ground truth images of the training samples using the output imaging configuration.

16. The method of operating a high-content imaging system of claim 11, further including the steps of directing the image generator to automatically generate a plurality of input images of a plurality of samples disposed in a microplate disposed on the stage in accordance with the input imaging configuration and directing the machine learning system to automatically generate an output image in accordance with the output imaging configuration from each one of the plurality of input images.

17. The method of operating a high-content imaging system of claim 16, further including the steps of operating a robotic microplate loader to load a further microplate on the stage after the plurality of input images has been generated, directing the image generator to automatically generate a further plurality of input images of the further microplate, and directing the machine learning system to automatically generate a further plurality of output images from the further input images.

18. The method of operating a high-content imaging system of claim 11, further including the steps of directing the image generator to develop a series of input images of the sample taken at varying focal points in accordance with the input imaging configuration and to simultaneously provide the series of images to the machine learning system, and in response automatically generating, by the machine learning system, a series of output images in accordance with the output imaging configuration.

19. The method of operating a high-content imaging system of claim 11, further including the step of transmitting the image generated by the image generator and the output image to a computer external to the high-content imaging system.

20. The method of operating a high-content imaging system of claim 11, wherein the input imaging configuration specifies a first set of physical components present in the high-content imaging system and the output imaging configuration specifies a second set of physical components, wherein at least one of the second set of physical components is not present in the high-content imaging system.

* * * * *